United States Patent [19]
Hanson et al.

[11] Patent Number: 5,201,185
[45] Date of Patent: Apr. 13, 1993

[54] METHOD OF OPERATING A TRANSPORT REFRIGERATION UNIT

[75] Inventors: Jay L. Hanson, Bloomington; James E. Nixon, Woodbury; Romuald M. Jurewicz, St. Louis Park; Jeffrey B. Berge, Bloomington; Jayaram Seshadri, Minneapolis, all of Minn.

[73] Assignee: Thermo King Corporation, Minneapolis, Minn.

[21] Appl. No.: 728,472

[22] Filed: Jul. 11, 1991

[51] Int. Cl.$^5$ .............................. F25D 21/06
[52] U.S. Cl. ........................ 62/81; 62/126; 62/155; 62/156; 62/234
[58] Field of Search ............... 62/81, 126, 129, 155, 62/156, 234

[56] References Cited

U.S. PATENT DOCUMENTS

| | | | |
|---|---|---|---|
| 3,726,104 | 4/1973 | Howland | 62/140 |
| 4,646,529 | 3/1987 | Hanson | 62/155 |
| 4,663,725 | 5/1987 | Truckenbrod et al. | 364/505 |
| 4,665,710 | 5/1987 | Kyzer et al. | 62/155 |
| 4,903,500 | 2/1990 | Hanson | 62/156 |

Primary Examiner—John Rivell
Attorney, Agent, or Firm—D. R. Lackey

[57] ABSTRACT

The invention relates to methods of defrosting an evaporator coil of a transport refrigeration unit which includes microprocessor based electrical control. The electrical control maintains the temperature of a conditioned space at a predetermined set point temperature via hot gas heating and cooling cycles. The evaporator coil is defrosted to remove frost and ice by closing a damper to the served space and initiating a heating cycle. At the termination of defrost, a cooling cycle is initiated, but the damper is maintained in a closed position for a predetermined period of time to remove heat built up during the defrost process. The invention also detects damper malfunctions, including failure to close prior to defrost, and failure to open after defrost. The invention also evaluates manual and timed requests for a defrost operation, overriding the requests in response to predetermined conditions.

9 Claims, 10 Drawing Sheets

METHOD OF OPERATING A TRANSPORT REFRIGERATION UNIT

TECHNICAL FIELD

The invention relates in general to transport refrigeration units, and more specifically to methods of defrosting transport refrigeration units.

BACKGROUND ART

U.S. Pat. No. 4,663,725, which is assigned to the same assignee as the present application, discloses the use of microprocessor based refrigeration control in a transport refrigeration system. This patent teaches initiating defrost: (1) on a time cycle, such as once every four hours; (2) on a need for defrost, such as when the temperature of the evaporator coil is below 45 degrees F.; and (3) in response to a manually entered request for defrost. In the defrost cycle of the aforesaid patent, the evaporator fan and compressor motor are turned off and electrical resistance elements are turned on. When the temperature of the evaporator coil rises above 56 degrees F., the defrost cycle is terminated. If the defrost cycle is not ended within 45 minutes, a system fault is generated, the defrost cycle is ended, and cooling is resumed.

It would be desirable, and it is an object of the present invention, to expand upon the defrost operation of the aforesaid patent, including adding desirable functions related to whether defrost should be initiated in response to manual and timed requests for defrost, as well as adding desirable protective and diagnostic functions related to defrost, once the defrost process has been initiated.

SUMMARY OF THE INVENTION

Briefly, the present invention relates to methods of defrosting an evaporator coil of a transport refrigeration unit which includes microprocessor based electrical control. The electrical control maintains the temperature of a conditioned space at a predetermined set point temperature via hot gas heating and cooling cycles, and the evaporator coil is defrosted to remove frost and ice by closing a damper to the served space and initiating a heating cycle. At the termination of defrost, a cooling cycle is initiated, but the damper is maintained in a closed position for a predetermined period of time to remove heat from the evaporator built up during the defrost process, thus preventing this heat from being discharged into the cargo space. Dissipation of the evaporator heat after defrost, before opening the damper, provides a smoother operation as it eliminates "sensor hunt" by the air temperature sensors which detect the temperature of the served space and control the operation of the transport refrigeration unit.

The invention also prevents the initiation of a defrost operation when the damper does not close, and it shuts the transport refrigeration unit down after a defrost operation, in the event the damper does not reopen.

The invention also evaluates manual and timed requests for a defrost operation, overriding the requests in response to predetermined conditions, such as: (1) failure of an evaporator coil temperature sensor, (2) the temperature of the evaporator coil exceeding a predetermined value, (3) the set point temperature being above a predetermined value, (4) the compressor not running, and the like.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
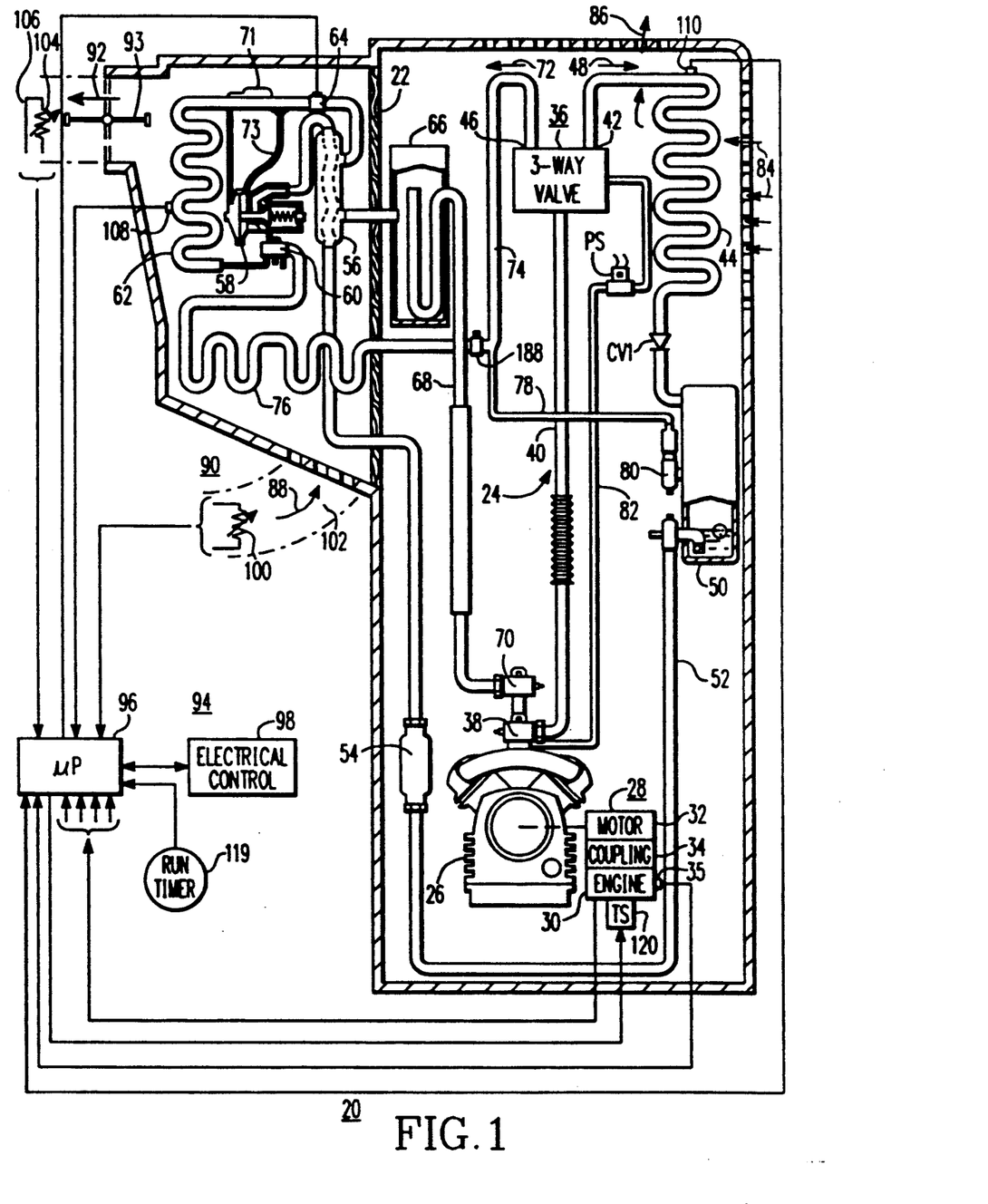
FIG. 1 is a partially block and partially schematic diagram of a refrigeration system which may be controlled by the methods of the invention.

Referring now to the drawing, and to FIG. 1 in particular, there is shown a transport refrigeration unit 20 which may be controlled according to the methods of the invention. Refrigeration unit 20 may be mounted on a container, truck, or trailer, such as on a wall 22 thereof, for example. Refrigeration unit 20 has a closed fluid refrigerant circuit 24 which includes a refrigerant compressor 26 driven by a prime mover arrangement 28. Prime mover arrangement 28 includes an internal combustion engine 30, and it may optionally include a stand-by electric motor 32. Engine 30 and motor 32 are coupled to compressor 26 by a suitable clutch or coupling 34 which disengages engine 30 while motor 32 is operative. A selector 35 selects the desired prime mover.

Discharge ports of compressor 26 are connected to an inlet port of a three-way valve 36 via a discharge service valve 38 and a hot gas line 40. The functions of three-way valve 36, which selects heating and cooling cycles, may be provided by two separate valves, if desired. Three-way valve 36 has a first output port 42, which is selected to initiate a cooling cycle, with the first output port 42 being connected to the inlet side of a condenser coil 44. Three-way valve 36 has a second outlet port 46, which is selected to initiate a heating cycle, as will be hereinafter described. Expansion valve 58 is controlled by a thermal bulb 71 and an equalizer line 73.

When three-way valve 36 selects the cooling cycle output port 42, it connects compressor 26 in a first refrigerant circuit 48, which in addition to condenser 44, includes a one-way condenser check valve CV1, a receiver 50, a liquid line 52, a refrigerant drier 54, a heat exchanger 56, an expansion valve 58, a refrigerant distributor 60, an evaporator coil 62, an optional controllable suction line modulation valve 64, another path through heat exchanger 56, an accumulator 66, a suction line 68, and back to a suction port of compressor 26 via a suction line service valve 70. The operative prime mover may be protected against overload by controlling modulation valve 64 to provide the function of a conventional compressor throttling valve, as taught by U.S. Pat. No. 4,977,751, which is assigned to the same assignee as the present application; or, a conventional compressor throttling valve may be disposed in suction line 68, as desired.

When three-way valve 36 selects the heating cycle output port 46, it connects compressor 26 in a second refrigerant circuit 72. The second refrigerant circuit 72 by-passes condenser 44 and expansion valve 58, connecting the hot gas output of compressor 26 to the refrigerant distributor 60 via a hot gas line 74 and a defrost pan heater 76. A hot gas by-pass valve 188, shown in FIG. 1, controlled by a hot gas solenoid 77 shown in FIG. 2B, may be disposed in hot gas line 74. A by-pass or pressurizing line 78 connects hot gas line 74 to receiver 50 via by-pass and check valves 80, to force refrigerant from receiver 50 into an active refrigerant circuit during heating and defrost cycles.

A conduit or line 82 connects three-way valve 36 to the low side of compressor 26 via a normally closed pilot solenoid valve PS. When solenoid valve PS is de-energized and thus closed, three-way valve 18 is spring biased to select the cooling cycle output port 42. When evaporator 62 requires defrosting, and when the load being conditioned requires heat to maintain set point, pilot solenoid valve PS is energized to allow the low pressure side of compressor 26 to operate three-way valve 36 to select the heating cycle output port 46.

A condenser fan or blower (not shown) causes ambient air 84 to flow through condenser coil 44, with the resulting heated air 86 being discharged to the atmosphere. An evaporator fan or blower (not shown) draws air 88, called "return air", from a served space 90 whose air is to be conditioned, through the evaporator coil 62, and the resulting cooled or heated air 92, called "discharge air" is returned to the space 90. During an evaporator defrost cycle, the evaporator fan or blower is operated, and a defrost air damper 93 is operated from the illustrated open position to the broken line position, to close the discharge air path to the conditioned space 90.

Transport refrigeration unit 20 is controlled by microprocessor based electrical control 94 which includes a microprocessor 96 and electrical control 98. Electrical control 98 includes relays, and the like, as will be explained relative to FIGS. 2A and 2B. The microprocessor 96 receives input signals from appropriate sensors, such as from a return air temperature sensor 100 disposed in a suitable return air path 102, a discharge air temperature sensor 104 disposed in a suitable discharge air path 106, from a coil temperature sensor 108 disposed to sense the temperature of the evaporator coil 62, from a refrigerant pressure sensor or high pressure cut-out (HPCO) 110 disposed on the high side of the refrigerant circuit 48, and from various engine sensors shown in FIG. 2B, such as oil level sensor 112, oil pressure sensor 114, engine coolant temperature sensor 116, and engine speed sensor 118.

Microprocessor 96, among other things, controls modulation valve 64, hot gas solenoid valve 77, and a throttle or high speed solenoid 120. Other functions controlled by microprocessor 96 are shown in FIGS. 2A and 2B, and will be hereinafter described.

Figure 2A:
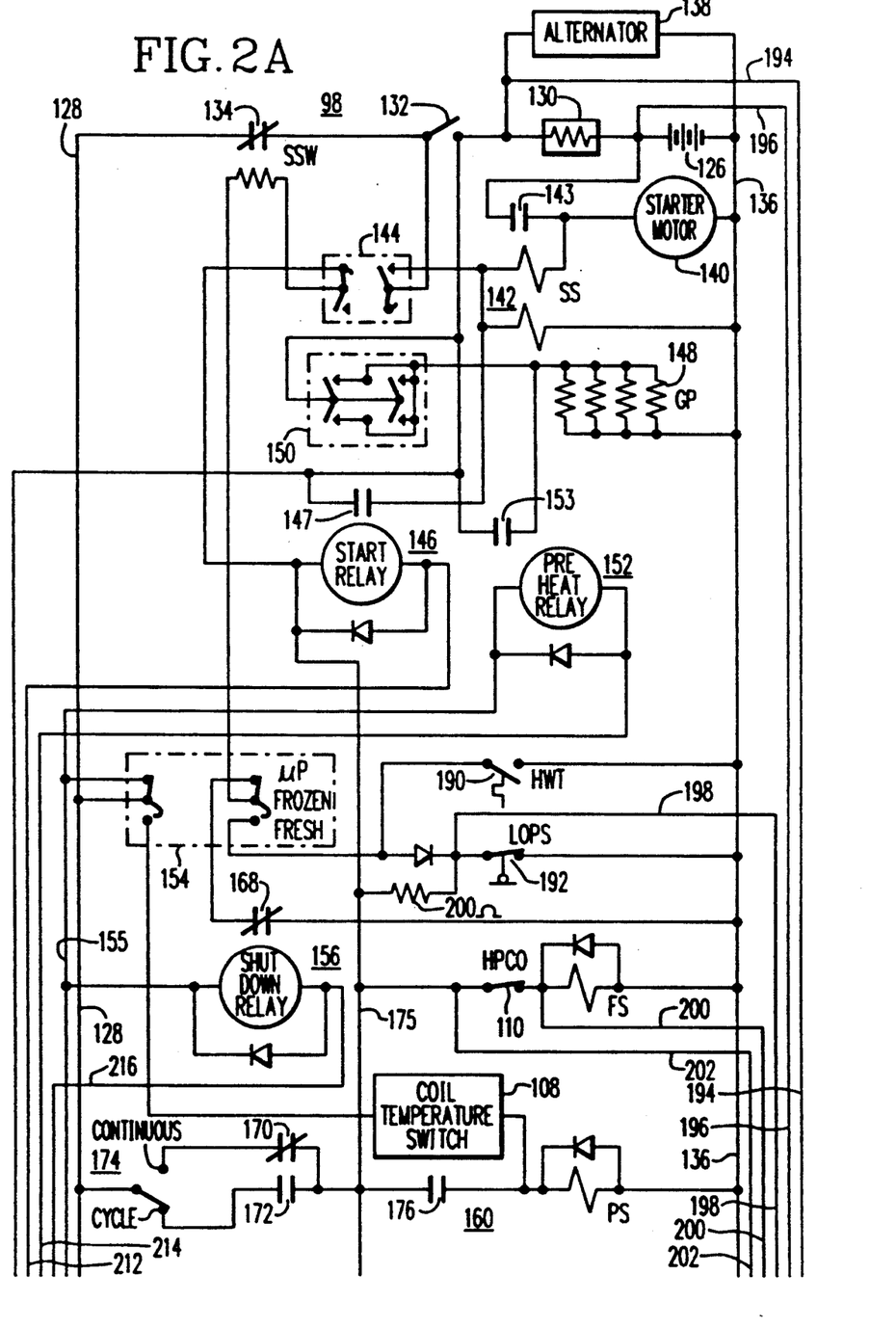
FIGS. 2A and 2B may be assembled to provide an electrical schematic diagram which implements the methods of the invention.
Figure 2B:
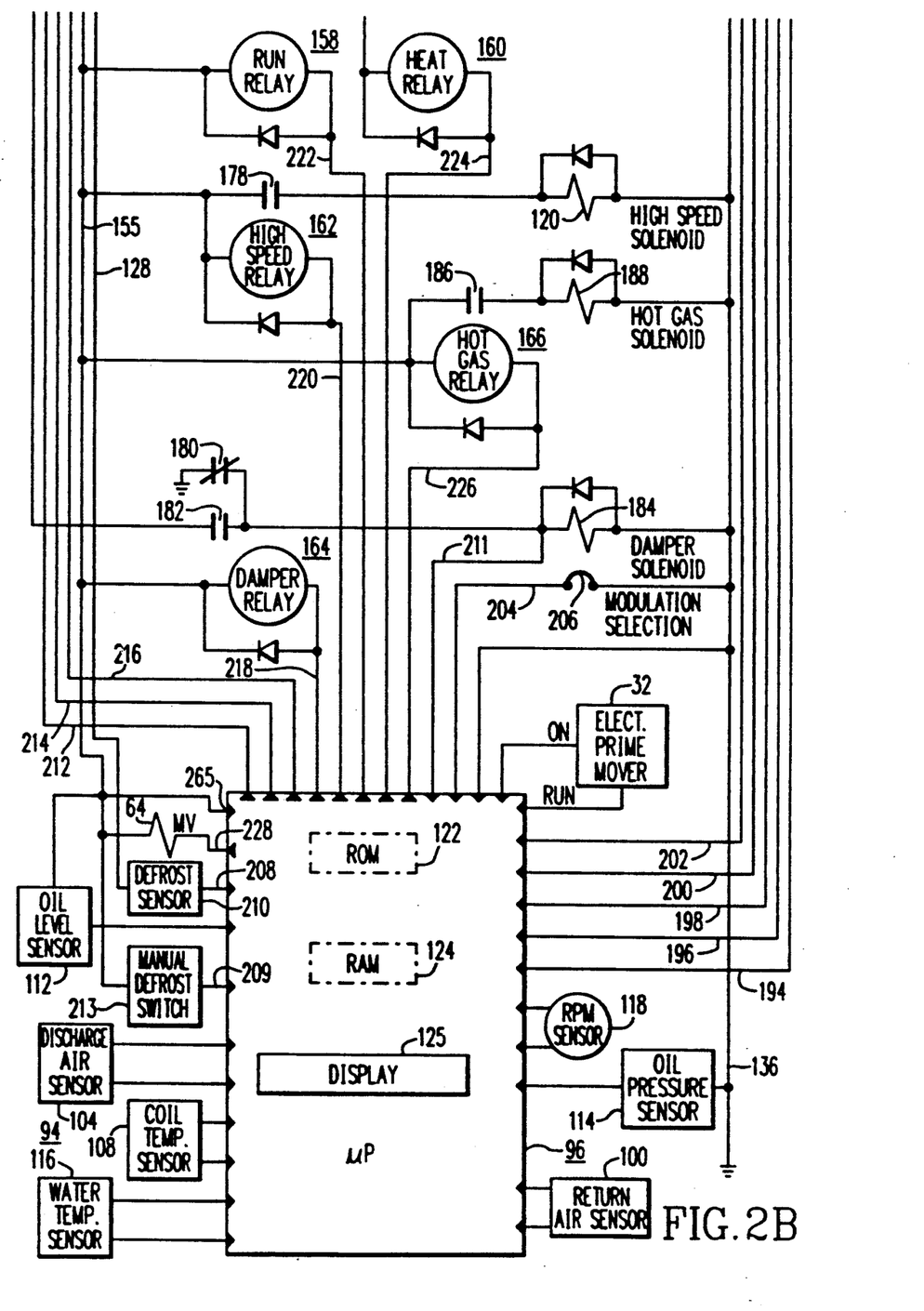

FIGS. 2A and 2B may be assembled to provide a detailed schematic diagram of microprocessor based electrical control 94, which includes microprocessor 96 and control 98. As is well known, microprocessor 96 includes a read-only memory (ROM) 122 for storing programs to be hereinafter described, and a random access memory (RAM) 124 for software timers, flags, input signals, output signals, and other values generated by the operating programs. Microprocessor 96 also has a display 125 for displaying fault codes, indicator lights, and the like.

Electrical control 98 includes a battery 126 which has one side connected to a first conductor 128 via a DC shunt 130, an on-off switch 132, and normally closed contacts 134 of a protective reset switch SSW. The remaining side of battery 126 is connected to conductor 136, which is grounded. Control 98 further includes an alternator 138 driven by prime mover 28; a starter motor 140, for cranking engine 30, which is controlled by a starter solenoid 142 having associated normally open contacts 143, an ignition switch 144, and a start relay 146 having associated normally open contacts 147; and glow plug resistors (GP) 148, for pre-heating engine 30, which are controlled by a pre-heat switch 150 and by a pre-heat relay 152 which has a set of normally open contacts 153.

Control 98 also includes a three-position switch 154 having two banks of three terminals. The three terminals, referring to their positions in FIG. 2A, include a center terminal, an upper terminal, and a lower terminal. Switch 154, in the illustrated upper position which connects the center terminal to the upper terminal in each bank, places unit 20 under control of the microprocessor 96. The upper position provides voltage from conductor 128 to a conductor 155.

An intermediate position of switch 154, in which the center terminal is not connected to either the upper or lower terminals, is selected when the microprocessor 96 is not utilized and the load in the conditioned space 90 is frozen. This switch position will cause unit 20 to operate continuously in a low speed cool mode.

The lower position of switch 154 is selected when the microprocessor 96 is not utilized and the load in the conditioned space is fresh. This position of switch 154 will cause unit 10 to operate continuously, cycling between heating and cooling cycles under the control of the hereinbefore mentioned coil temperature switch 108. Coil temperature switch 108 is preset to close at a predetermined coil temperature, such as 35 degrees F., to energize the pilot solenoid PS and initiate a heating cycle, and to open at a predetermined higher temperature, such as 38 degrees F., to de-energize pilot solenoid PS and initiate a cooling cycle.

In addition to the relays already mentioned, control 98 includes a shutdown relay 156, a run relay 158, a heat relay 160, a high speed relay 162, a defrost damper relay 164, and a hot gas relay 166. Shutdown relay 156, which has a set of normally closed contacts 168, is normally energized. Shutdown relay 156 is de-energized to shut unit 10 down via its contacts 168 which close to ground the protective switch SSW and cause it to open its contacts 134.

The run relay 158 has normally-closed and normally open contacts 170 and 172, respectively, connected to a mode selector switch 174 which has an input connected to conductor 128. Selector switch 174 selects either a continuous operating mode in which the prime mover 28 operates continuously, or a cycling start-stop mode which includes starting and stopping the prime mover 28. The normally-closed contacts 170 of run relay 158 are connected to the "continuous" position of selector switch 174, and the normally-open contacts 172 of run relay 158 are connected to the "cycling" position of selector switch 174. Contacts 170 or contacts 172 provide voltage to a conductor 175 from conductor 128 and selector switch 174.

Heat relay 160 has a set of normally open contacts 176 for controlling the pilot solenoid PS. High speed relay 162 has a set of normally open contacts 178 for controlling the high speed solenoid 120. Damper relay has a set of normally closed contacts 180 and a set of normally open contacts 182, connected to control a defrost damper solenoid 184. Defrost damper solenoid 184 controls the position of defrost damper 93, with damper 93 being open when the damper solenoid is de-energized, and with damper 93 being closed when damper solenoid is energized. Hot gas relay 166 is provided for controlling the hot gas solenoid 77 via a set of normally open contacts 186, when a hot gas solenoid operated valve 188 is provided in hot gas line 74.

Control 98 also includes an engine coolant temperature switch (high water temperature—HWT) 190, which closes upon an excessive engine temperature, and a low oil pressure switch (LOPS) 192 which is open as long as engine pressure is normal. The closing of either switch 190 or 192 will shut unit 20 down via the manual reset switch SSW.

Microprocessor 96 senses the voltage across DC shunt 130 via conductors 194 and 196, and can thus determine the magnitude and polarity of battery current. One polarity, which will be called positive, indicates the battery 126 is being charged by alternator 138, which also indicates the prime mover 28 is running. The other polarity, i.e., negative, indicates the battery is discharging.

Microprocessor 96 also has a conductor 198 which senses the position of the low oil pressure switch 192; conductors 200 and 202 which sense the voltage level on first and second sides, respectively, of the high refrigerant cut-out switch 110; a conductor 204 which senses whether or not a modulation valve selector jumper 206 has connected conductor 204 to system ground 136; a conductor 208 which senses whether or not a defrost sensor switch 210 has operated, signifying the need for a defrost cycle; a conductor 209 which detects when a manual defrost switch 213 has been actuated; and, a conductor 211 which detects whether or not the damper solenoid 184 is energized.

Microprocessor 96 has a plurality of output conductors for controlling various functions, including conductors 212, 214, 216, 218, 220, 222, 224 and 226 for respectively controlling the operation of start relay 146, pre-heat relay 152, shutdown relay 156, damper relay 164, high speed relay 162, run relay 158, heat relay 160, and hot gas relay 166. A conductor 228 is also provided for controlling the current level in the modulation valve 64.

Figure 3:
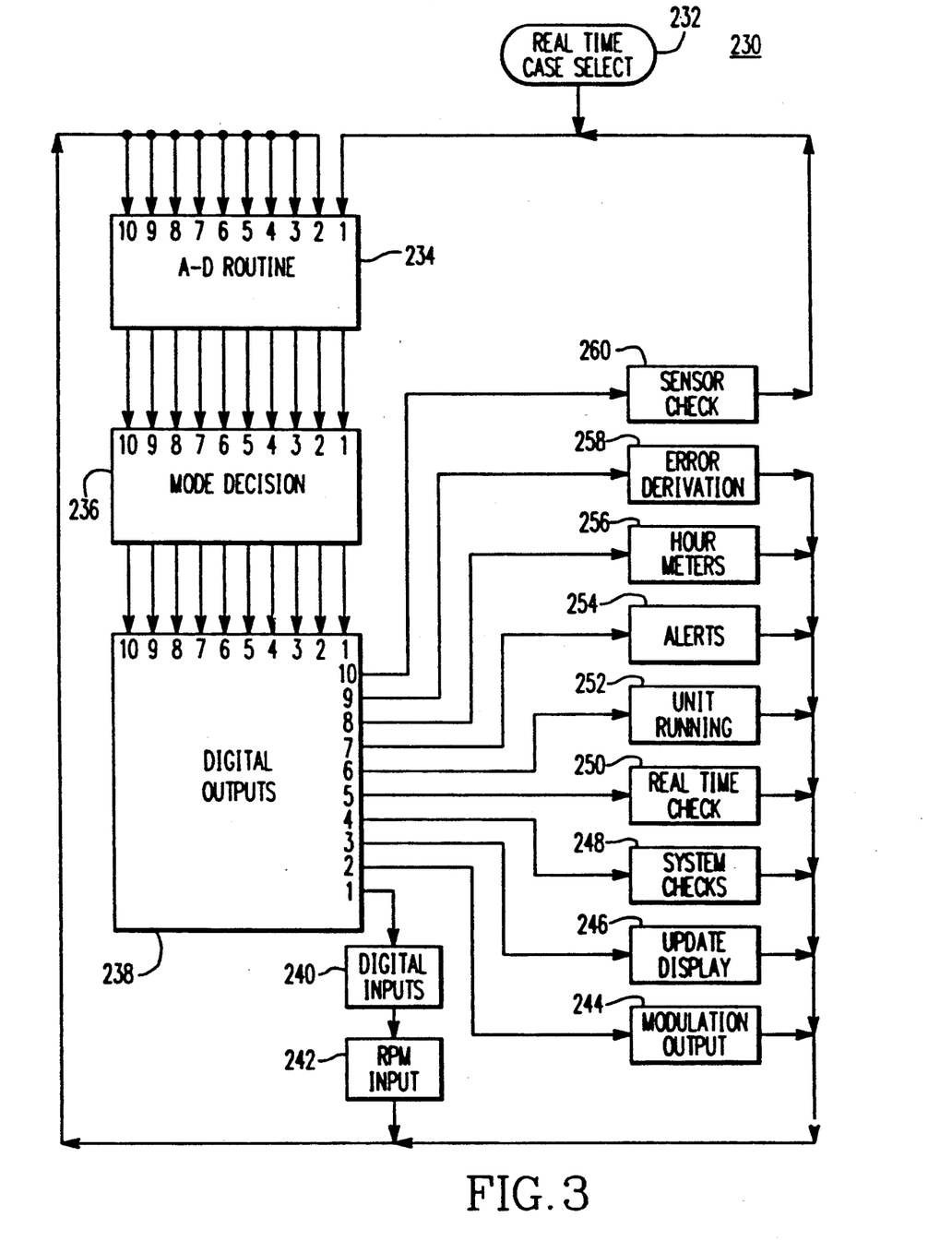
FIG. 3 is a block diagram of a time driven "real time case select" function performed by the microprocessor shown in FIGS. 1 and 2.

Microprocessor 96 is time driven, with a "real time case select" function 230, shown in FIG. 3, being repeated continuously. As the microprocessor functions are described, only those necessary to understanding the invention will be described in detail. Certain of the functions shown in block form, may be described in detail and claimed in concurrently filed application Ser. Nos. 07/728,464, now U.S. Pat. No. 5,123,253; 07/728,468, now U.S. Pat. No. 5,123,251; 07/728,665, now U.S. Pat. No. 5,140,826; 07/728,463, now U.S. Pat. No. 5,123,252; 07/728,467, now U.S. Pat. No. 5,103,783; 07/728,471, now U.S. Pat. No. 5,140,825; and 07/728,465.

Function 230 is entered at 232 and step 234 performs analog to digital conversions of the analog inputs from various analog sensors. Step 236 performs a mode decision function which will be hereinafter described relative to FIG. 4. Step 238 takes care of providing the necessary digital signals which control various functions of unit 20, step 240 receives digital inputs from various sensed functions, and step 242 receives the engine speed input from RPM sensor 118. The program then returns to step 234 and upon reaching step 238 during the second pass, the program goes to step 244 which takes care of setting the proper current level in the modulation valve 64. Steps 234, 236 and 238 are then repeated, adding step 246 on the third pass, which updates microprocessor display 125, such as status displays, as well as displays which set forth any alarm codes which may have been set. Step 248 is added on the fourth pass, which performs certain system checks, step 250 is added on the fifth pass, which performs certain real time checks, step 252 is added on the sixth pass, which performs a unit running check, step 254 is added on the seventh pass, which performs certain alert or alarm functions, step 256 is added on the eighth pass, which performs certain timing functions, step 258 is added on the ninth pass, which performs an error deviation function, and step 260 is added on a tenth pass, which checks the sensors for failure. Program 230 then repeats.

Figure 4:
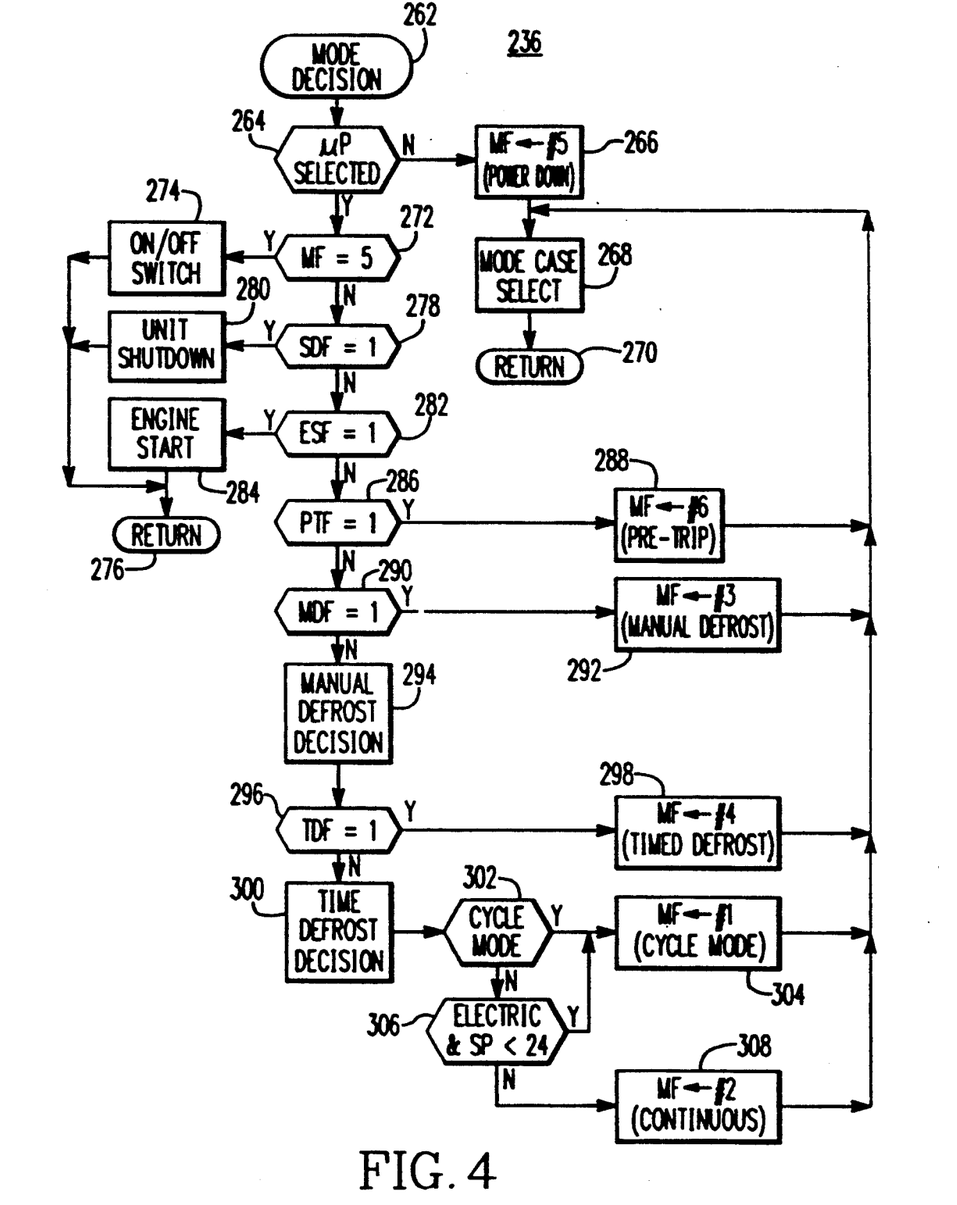
FIG. 4 is a flow chart illustrating a "mode decision" function performed by the microprocessor.

The mode decision program function 236, shown in FIG. 4, is entered at 262 and step 264 checks to see if microprocessor control has been selected via the three-position selector switch 154. If it has been selected, an input 265 on microprocessor 96 will be high. If microprocessor control has not been selected, step 266 sets a mode flag MF to "5", signifying a power down mode for microprocessor 96. The microprocessor then executes a mode case select function 268, shown in detail in FIG. 5, and the program exits at 270.

If step 264 finds that microprocessor control has been selected, step 272 checks to see if flag MF has been set to #5, signifying the power-down mode. If flag MF is set to #5, step 274 executes an on/off switch routine, and the program exits at 276. If flag MF is not set to #5, the program checks a shutdown flag SDF to see if it is true, which would indicate that some other program has requested that unit 20 be shut down. If shut down flag SDF is true, step 280 executes a unit shut down sequence, and the program exits at 276.

If shut down flag SDF is not true, step 282 checks to see if an engine start flag ESF is true, and if it is, step 284 executes a Diesel engine start routine, and the program exits at 276.

If flag ESF is not true, step 286 checks a pre-trip flag PTF to see if a pre-trip operation has been requested. The pre-trip operation causes a plurality of system self checks to be made to determine if the unit is ready for operation. If the flag PTF is true, step 288 sets mode flag MF to #6, indicating that the pre-trip routine should be performed.

If flag PTF is not true, step 290 checks a manual defrost flag MDF to see if it is true, and if it is, step 292 sets mode flag MF to #3, requesting defrost. If flag MDF is not true, step 294 performs a manual defrost decision block, shown in detail in FIG. 6, which could result in the setting of flag MDF for detection on the next run through the program.

Step 292 advances to step 292 which checks to see if a timed defrost flag TDF is true, and if it is, step 298 sets mode flag MF to #4, requesting defrost. If timed defrost flag TDF is not true, step 300 performs a timed defrost decision block, shown in detail in FIG. 7, which could result in the setting of flag TDF for detection on the next run through the program.

Step 300 advances to step 302 which checks to see if selector switch 174 has selected "cycle sentry", which is the mode in which the operative prime mover 28 is started and stopped according to the condition of the load in the served space 90. If the cycle mode has been selected, step 304 sets mode flag MF to #1.

If step 302 finds that the cycle sentry mode has not been selected, step 306 checks to see if the operative prime mover is the electric motor 32. If electric motor 32 is selected, a microprocessor input "on" associated with the selection of motor 32, will be true, and when electric motor 32 is running, a microprocessor input "run" will also be true, as set forth in FIG. 2B. If the operative prime mover is engine 30, not electric motor 32 the program goes to step 308, which sets mode flag MF to #2, indicating the continuous operating mode. If step 306 finds that the drive is the electric motor 32, step 306 further checks,.to see if the selected set point temperature is at or below 24 degrees F., indicating a frozen load. If the set point is above 24 degrees F., step 306 advances to step 308, just described. If the prime mover is the electric motor 32, and the set point indicates a frozen load, step 306 decides that the cycling mode should be used, notwithstanding the position of selector switch 174, going to step 304 which sets mode flag MF to #1, to indicate the cycling mode should be used.

Figure 5:
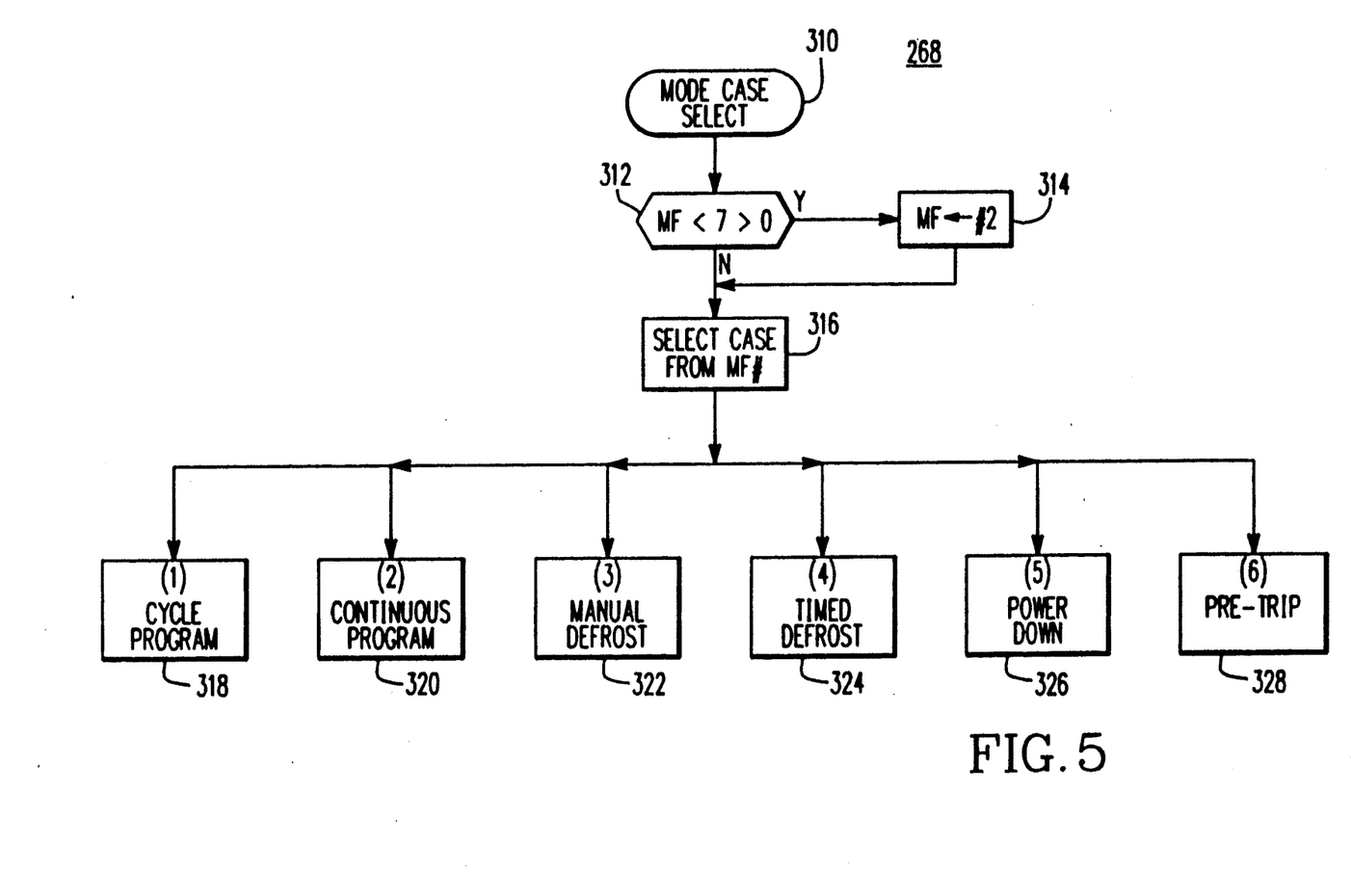
FIG. 5 is a flow chart of a "mode case select" function performed by the microprocessor.

FIG. 5 sets forth the mode case select function 268 shown in block form in FIG. 4. Function 268 is entered at 310 and step 312 checks to see if the number of the mode flag MF is in the correct range of 1 through 6. If it is not, step 314 sets flag MF to the default mode #2, which signifies the continuous mode. The "yes" branch from step 312 and step 314 both go to step 316 which determines the number of mode flag MF. The program goes to function 31B when mode flag MF is #1, to run a cycling mode program. The program goes to function 320 when mode flag MF is #2, to run a continuous mode program. The program goes to function 322 when mode flag MF is #3, to run a manual defrost program; to function 324 when mode flag MF is #4, to run a timed defrost program; to function 326 when mode flag MF is #5, to run a power down program; and, to function 328 when mode flag MF is #6, to run a pre-trip program.

Figure 6:
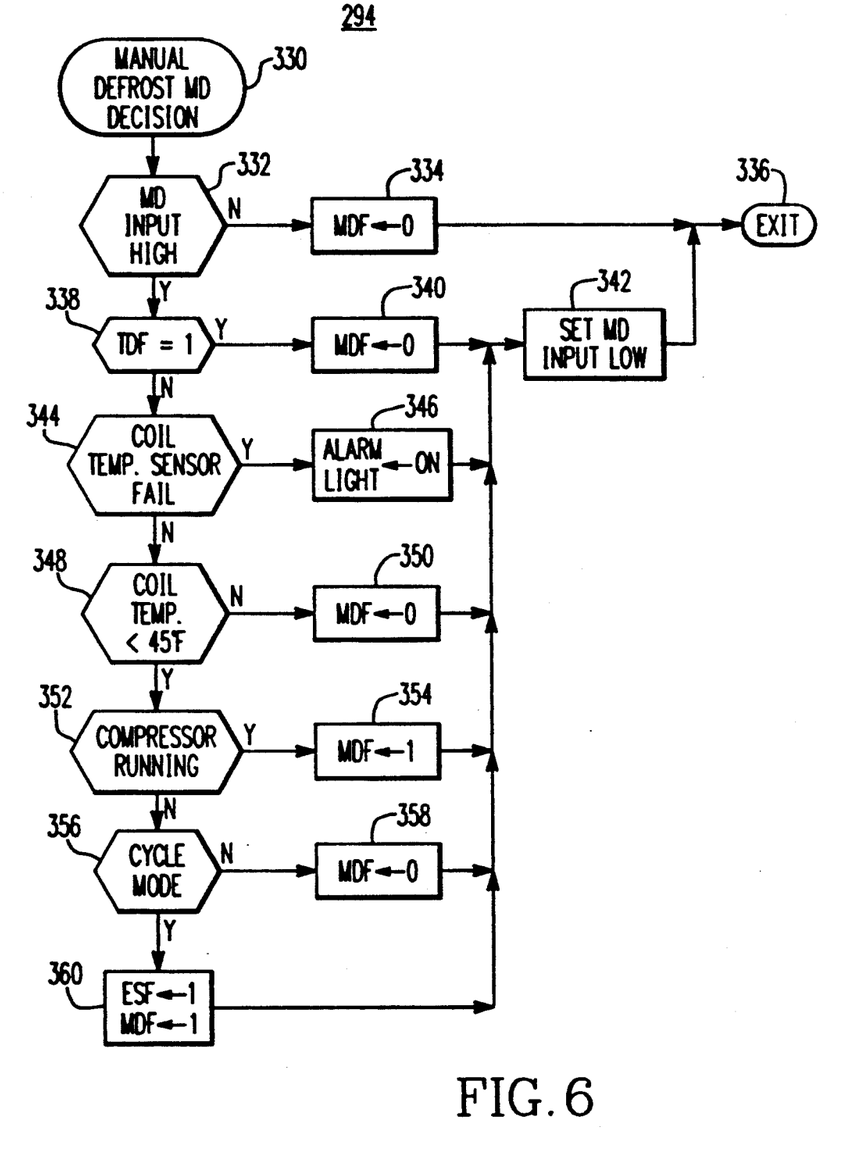
FIG. 6 is a flow diagram of a program which performs the manual defrost decision block shown in FIG. 4.

Function 294 of FIG. 4, a manual defrost decision function, is shown in detail in FIG. 6. The manual defrost decision function determines if a request for a manual defrost operation has been made, and if so, whether or not the request should be approved. As shown in step 290 of FIG. 4, the manual defrost decision program 294 is run when a manual defrost flag MDF is not true. A true flag MDF means that a manual defrost request has previously been made via manual defrost switch 213 shown in FIG. 2B, and that program 294 shown in FIG. 6 has already approved the request and set flag MDF true. Once flag MDF has been set true, steps 290 and 292 of the mode decision program 236 shown in FIG. 4, and block 322 of the mode case select program 268 shown in FIG. 5, will run the manual defrost program 322, as will be hereinafter described relative to FIGS. 8A and 8B.

Manual defrost decision program 294 is entered at 330 and step 332 determines if the manual defrost input MD is high. Manual defrost input MD is provided by manual defrost switch or button 213 shown in FIG. 2B, and conductor 209. Once input MD is detected as being actuated, i.e., at the voltage level of battery 130 or alternator 138, microprocessor 96 latches the input and retains it until program 294 resets it.

If step 332 finds the manual defrost input MD is not high, step 334 sets the manual defrost flag MDF low, ie., not true, and the program exits at 336. If step 332 finds input MD high, then the operator of unit 20 has requested a manual defrost operation, and program 294 continues from step 332 to step 338. Step 338 determines if the timed defrost flag TDF is true. Timed defrost, which is automatically requested at timed intervals, results in the setting of the timed defrost flag TDF when the program of FIG. 7 approves the request. An approved request for a time initiated defrost overrides a manual request for defrost. Thus, when step 338 finds that flag TDF is true, step 340 sets the manual defrost flag MDF false, step 342 resets the MD input, i.e., input MD is set low, and the program exits at 336.

When step 338 finds that timed defrost is not active, step 338 proceeds to step 344 which checks a coil sensor fail flag CSFF, to determine if the evaporator coil temperature sensor 108 shown in FIG. 1 is functional, or faulty. Coil sensor fail flag CSFF is set true, when found to be faulty, in sensor checking programs shown in detail in the hereinbefore mentioned U.S. Pat. Nos. 5,123,253 and 5,123,252. Failure of the evaporator coil temperature sensor 108 overrides a request for manual defrost. Thus if step 344 finds flag CSFF true, step 346 turns on an alarm indicator light in display 125, shown in FIG. 2B, step 342 resets the manual defrost request, and the program exits at 336.

If step 344 finds the evaporator coil temperature sensor 108 functional, step 348 checks the sensor input to read the temperature of evaporator coil 62. If the coil temperature is not less than a predetermined value, such as 45 degrees, for example, then evaporator coil 62 should have no frost build up, making defrost unnecessary. Thus, if step 348 finds that the temperature of evaporator coil is not less than the predetermined value, step 350 sets the manual defrost flag MDF to 0, step 342 resets the request for manual defrost, and the program exits at 336.

When step 348 finds the temperature of evaporator coil 62 is less than the predetermined value, step 352 checks to determine if compressor 26 is running. For example, if engine 30 is the selected prime mover, microprocessor 96 can check its input conductor 200 to determine if fuel solenoid FS is energized. If electric motor 32 is selected as the prime mover, microprocessor 96 can check its electric run input "run" shown in FIG. 2B. If step 352 finds compressor 26 running, then the manual defrost request has passed all of the requirements for approval of the request, i.e., the manual defrost switch 213 has been actuated, timed defrost is not active, the coil temperature sensor 108 is functional, the temperature of evaporator coil 62 is below a predetermined temperature, e.g., 45 degrees F., and compressor 26 is running. Step 352 then goes to step 354 which sets the manual defrost flag MDF true, and step 342 resets the request. The true flag MDF is all that is required for steps 290 and 292 of the mode decision program 236 shown in FIG. 4 to set the mode flag MF to #3, requesting manual defrost. The mode case select program 268 shown in FIG. 5 will then run the manual defrost program 322, which will be hereinafter described relative to FIGS. 8A and 8B. The program then exits at 336.

If step 352 finds that compressor 26 is not running, step 356 determines if switch 174 has been set to select the cycle mode of operation, during which the selected prime mover and compressor 26 are stopped when the served space 90 is satisfied, requiring neither heat nor cold to hold set point. If step 356 finds that transport refrigeration unit 20 is set to operate in the continuous mode, and not in the cycle mode, then a stopped compressor overrides a request for manual defrost. Step 358 thus sets the manual defrost flag MDF to 0, step 342 resets the request, and the program exits at 336. When step 356 finds that the compressor 26 is not running due to operation of unit 20 in the cycle mode, then step 360 initiates the starting of the prime mover and compressor 26 by setting the engine start flag ESF true, and the request for manual defrost is approved by setting the manual defrost flag MDF true. Step 342 resets the request for manual defrost, and the program exits at 336. When step 282 of the mode decision program 236 shown in FIG. 4 finds engine start flag ESF true, step 284 starts the prime mover, as set forth in detail in the hereinbefore mentioned U.S. Pat. No. 5,140,826.

Figure 7:
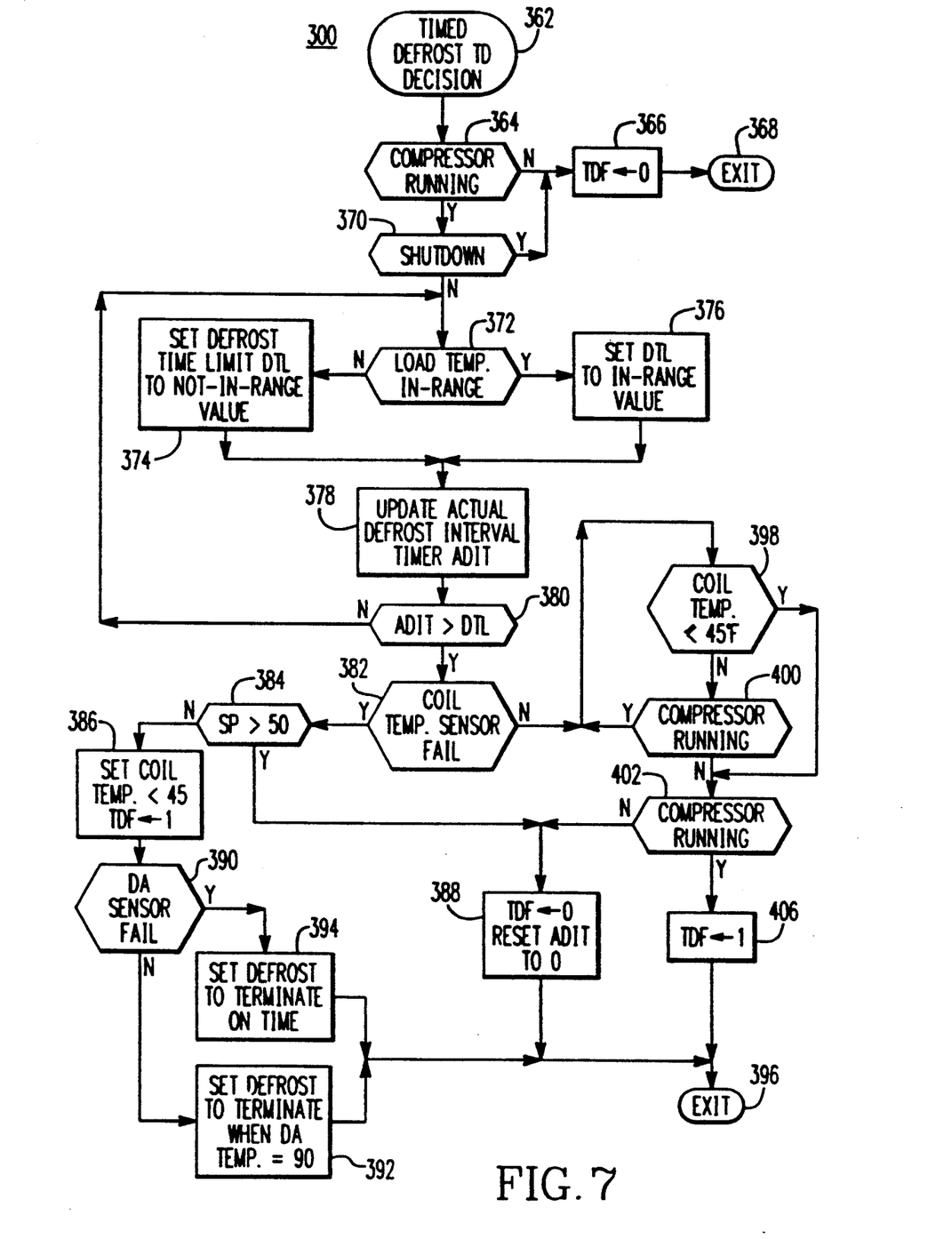
FIG. 7 is a flow diagram of a program which performs the timed defrost decision block shown in FIG. 4.

Function 300 of FIG. 4, a time defrost decision function, is shown in detail in FIG. 7. The time defrost decision function 300 determines if it is time for a defrost operation, and if so, whether or not a time requested defrost operation should be approved. As shown in steps 296 and 298 of FIG. 4, and block 324 of FIG. 5, the time defrost program 324 is run when a time defrost flag TDF is true. A true flag TDF means that a time defrost "request" has been made, as determined by program 300, and that program 300 has approved the request and set flag TDF true. Thus, as shown in FIG. 4, the decision on whether or not to set flag TDF true is only made when step 296 finds that flag TDF is not already true. Step 296 advances to block 300, when flag TDF is not true, with block 300 being the time defrost decision program set forth in detail in FIG. 7. The time defrost decision program 300 shown in FIG. 7 is entered at 362 and step 364 determines if compressor 26 is running. If compressor 26 is not running, a time defrost operation will not be initiated. Unlike the manual defrost request, a time defrost request will not start a compressor which is idle because of cycle operation, to perform a defrost. When a manual defrost request is made, it presumably is made because the operator has detected a need for a defrost operation, and therefore an idle compressor operating in cycle mode will be started to perform defrost. When a time request for defrost is made, it is not known whether or not defrost is actually required, and thus a time defrost can wait until the compressor is running. Thus, when step 364 finds that compressor 26 is not running, step 366 sets the time defrost flag not-true, and the program exits at 368.

When step 364 finds compressor 364 running, step 370 determines if unit 20 is in the process of being shut down, eg., by checking the shut down flag SDF. If unit 20 is in the process of being shut down, then a time defrost operation will not be run, and the program returns to step 366 and exits at 368.

If step 370 finds that unit 20 is not being shut down, then steps 372, 374, and 376 determine what time interval since the last defrost operation should trigger a timed request for defrost. This dynamic selection of time interval is initiated by step 372 determining if the load temperature, i.e., the temperature of the served space 90, is within a predetermined range, called "in-range", of the selected set point temperature. If the load temperature is outside of this predetermined range, called "not in-range", then the time interval since the last operation, referred to as defrost time limit DTL, is set by step 374 to a first predetermined value stored in microprocessor memory for the not in-range condition. When the load temperature is "in-range", then step 376 sets the defrost time limit DTL to a second predetermined value stored in microprocessor memory for the in-range condition. The hereinbefore mentioned U.S. Pat. Nos. 5,140,826 and 5,123,252, set forth control algorithms which illustrate typical in-range and not in-range temperature differentials relative to the selected set point temperature. The philosophy is, in general, to provide a longer DTL time interval when the temperature of the served space 90 is in-range than when the temperature of the served space 90 is not in-range.

Step 378 updates an actual-defrost-interval timer ADIT, which records the time since the last defrost operation, and step 380 compares the actual time since defrost, i.e., the time on timer ADIT, with the DTL time limit value set in either step 374 or step 376. Until the actual time since the last defrost operation ADIT exceeds the defrost time limit DTL, program 300 does nothing each time it is run except: (1) check to make sure DTL is set properly according to whether the load temperature is in-range, or not in-range (2) update the actual time since defrost on timer ADIT, and compare ADIT with DTL.

Once step 380 finds that ADIT exceeds DTL, then program 300 advances to step 382 which checks the hereinbefore mentioned coil sensor fail flag CSFF to determine if the evaporator coil temperature sensor 108 is functional. If step 382 finds flag CSFF set, indicating sensor 108 is faulty, step 384 compares the selected set point temperature SP with a predetermined temperature value which is well above freezing, such as 50 degrees F. If step 384 finds that the set point is not above the predetermined value, which is 50 degrees F. in the example, then step 386 arbitrarily sets the coil temperature as being below a predetermined value, such as 45 degrees F., and step 386 also requests the time defrost operation by setting the time defrost flag TDF true.

If unit 20 is controlling load space 90 to a set point above 50 degrees, then evaporator coil 62 should not require defrosting and step 384 goes to step 388 which resets timer ADIT to zero, and step 388 also sets the timed defrost flag TDF low or not-true, to prevent a time defrost operation from running. Program 300 then exits at 396.

When step 386 set flag TDF true, to request a time defrost operation, this was done with the knowledge that the coil temperature sensor 108 is faulty. Thus, program 300 continues from step 386 to steps 390, 392 and 394, which determine how the time initiated defrost operation should be terminated, since the temperature of evaporator coil 62 cannot be used to terminate defrost. This feature is implemented by step 390 first determining if the discharge air temperature sensor 104 shown in FIG. 1 is functional, or faulty. The same program which checked coil sensor 108 in the hereinbefore mentioned copending applications sets a discharge air sensor fail flag DASFF true when discharge air temperature sensor 104 is not found to be accurate, and step 390 thus checks this flag. If flag DASFF is not true, sensor 104 is functional, and step 392 sets defrost to terminate when the discharge air temperature reaches a predetermined value, such as 90 degrees F., and the program exits at 396. If step 390 finds flag DASFF true, i.e., sensor 104 is faulty, then step 394 sets the time initiated defrost operation to terminate after the defrost operation has continued for a predetermined time interval. All defrost operations are backed up with a defrost duration timer DDT, which terminates defrost when a predetermined time limit is reached, and step 394 may leave the DDT time limit unchanged, or it may change it, as desired. Step 394 then exits at 396.

When step 382 finds the evaporator coil temperature sensor 108 functional, step 398 checks the temperature of evaporator coil 62 and compares it with a predetermined value, such as 45 degrees F. If the coil temperature is not less than this predetermined value, step 400 determines if compressor 26 is running. If compressor 26 is running, program 300, each time it is run, will do nothing further until finding either that the temperature of the evaporator coil 62 is less than the predetermined value, e.g., 45 degrees F., or compressor 26 is not running. Step 402 determines which of these two events occurred by checking to determine if compressor 26 is running. If compressor 26 is running, it indicates that the program arrived at this point because the temperature of the evaporator coil 62 is below 45 degrees F., and program 300 will now "approve" the time defrost request initiated by the "yes" branch of step 380, by advancing to step 406 which sets the time defrost flag true, and the program exits at 396.

If step 402 finds that compressor 26 is not running, then step 402 goes to the hereinbefore described step 388, which will not allow a time defrost operation, resetting timer ADIT to 0, and setting time defrost flag TDF not-true. The program then exits at 396.

A true setting of the manual defrost flag MDF in manual defrost decision program 294 of FIG. 6, or a true setting of the timed defrost flag TDF in the time defrost decision program 300 of FIG. 7, results in either mode flag #3 or mode flag #4 being set in steps 292 or 298 of the mode decision program 236 of FIG. 4. The mode case select program 268 of FIG. 5 will accordingly run either the manual defrost program 322 or the time defrost program 324. While programs 322 and 324 may be different programs, they are very similar, allowing both to be covered with a single program 322 set forth in FIGS. 8A and 8B. The differences between the two programs are set forth, when appropriate, by program 322 determining if manual or timed defrost is being run, and branching accordingly to implement the differences.

Figure 8A:
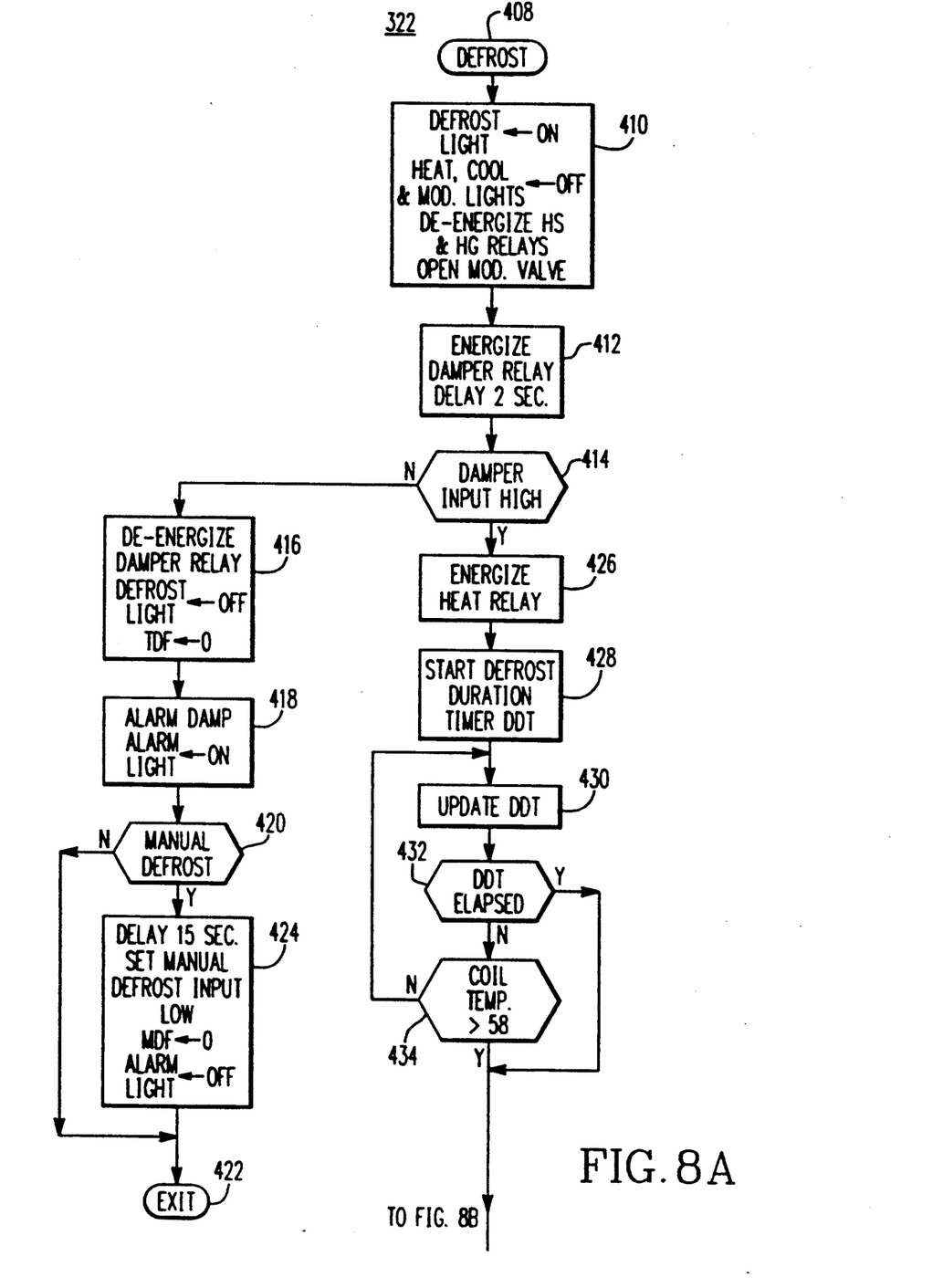
FIGS. 8A and 8B may be assembled to provide a flow diagram of a program which performs defrost operations, when requested by the manual and timed defrost decision blocks.

The defrost program 322 is entered at 408 and step 410 performs the following: (1) a defrost light on display 125, FIG. 2B, is turned on; (2) any active lights on display 125 associated with a heat cycle, a cooling cycle, and/or suction line modulation, are turned off; (3) the modulation valve 64 is fully opened, if it is not already open, by reducing the current through the modulation valve 64 to zero; (4) the high speed relay 162 is de-energized, if energized, to place engine 30 and compressor in "low speed"; and (5) the hot gas relay 166 is de-energized, if energized, to de-energize hot gas solenoid 77 and open the hot gas valve 188.

Step 412 then energizes damper relay 164, which should energize damper solenoid 184 and cause damper 93 to close the discharge air path from unit 20 to the served load space 90. After a short delay, step 414 determines if damper solenoid is properly energized, by checking input line 211 shown in FIG. 2B. If input line 211 is not high, i.e., energized, then the damper relay 164 failed to operate properly in response to step 412, and step 414 branches to step 416 which de-energizes damper relay 164. Step 416 also turns the defrost indicator light in display 125 off, and it sets the time defrost flag TDF not-true. Step 418 sets an alarm DAMP, and turns on an alarm indicator light in display 125. The operator can determine the cause of the alarm by requesting an alarm code to be displayed on display 125, which alarm code will identify the damper relay as the cause of the alarm. Step 420 determines if the defrost operation started at 408 was a manual defrost, and if it was not, the program exits at 422. If step 420 finds that the defrost operation was in response to a manual defrost, step 424 delays for a time, such as 15 seconds, to allow the alarm indicator light to remain energized during this time, and then step 424 resets the manual defrost input MD, it sets the manual defrost flag MDF not-true, and it turns the alarm indicator light in display 125 off.

If damper relay 164 functioned properly, the damper input 211 will be high, and damper 93 should be closed. Step 414, upon finding damper input 211 high, then goes to step 426 which energizes heat relay 160. An energized heat relay 160 places unit 20 in a hot gas heating cycle, directing hot refrigerant from compressor 26 directly to the evaporator coil 62 via three-way valve 36 and the open hot gas valve 188, which will defrost evaporator coil.

Figure 8B:
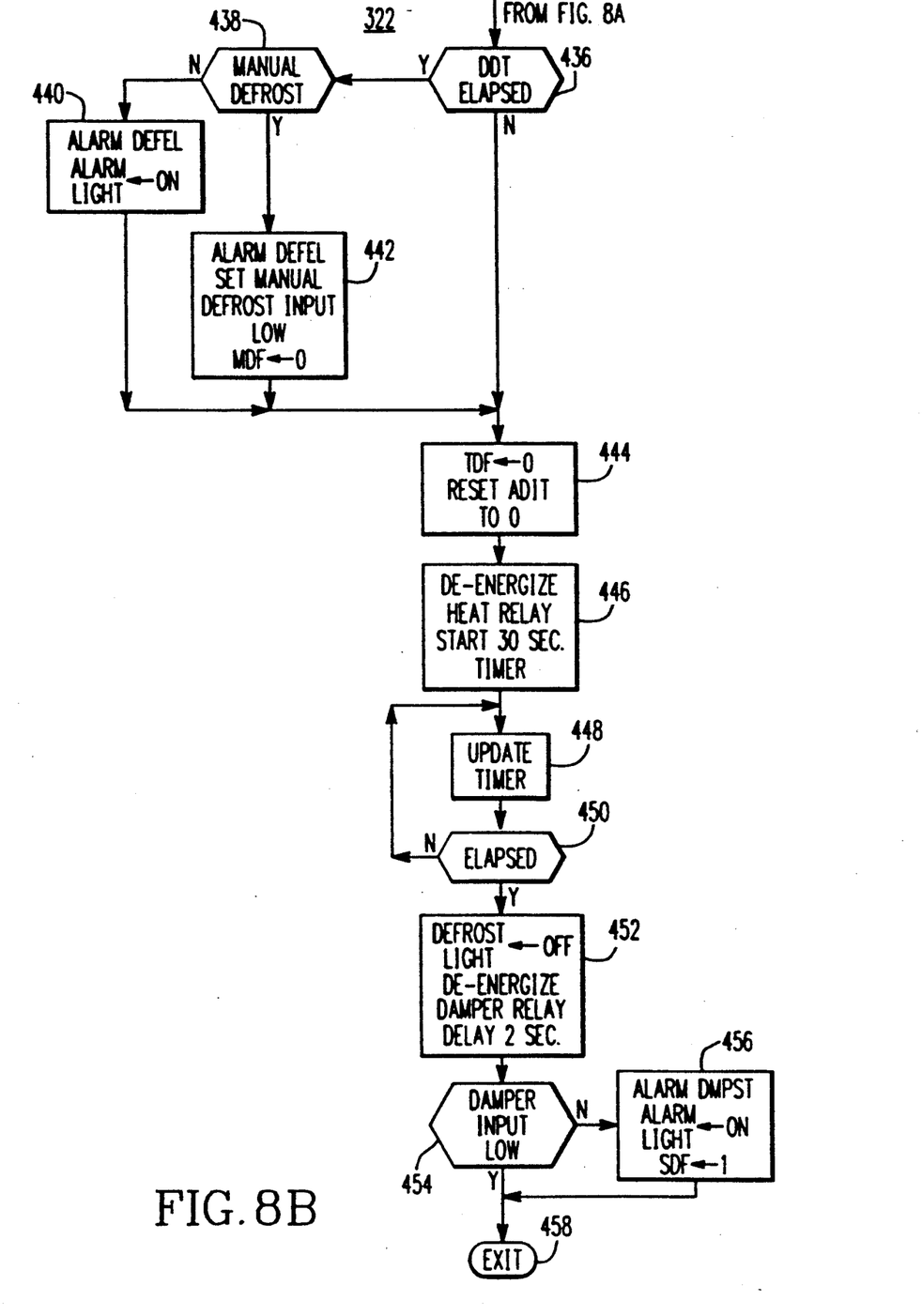

Step 428 starts the hereinbefore mentioned defrost duration timer DDT, and step 430 updates timer DDT. Step 432 checks timer DDT to see if the maximum allowable defrost time has elapsed. If it has not elapsed, then step 434 compares the temperature of the evaporator coil, provided by coil temperature sensor 108, with a predetermined value, such as 58 degrees F. If the coil temperature does not exceed 58 degrees F., the program returns to step 430 to update timer DDT, and program 322 will do nothing further each time it is run, other than update the DDT time, until either the DDT time elapses or the temperature of evaporator coil 62 exceeds 58 degrees F.

Upon breaking out of this loop, step 436 determines which event advanced the program by checking timer DDT. If timer DDT has elapsed, step 438 determines if the defrost operation is the result of a manual request or a timed request, with a timed request going to step 440 which sets an alarm DEFEL and turns on the alarm indicator light in display 125. An alarm code indicating that defrost was terminated by the maximum defrost time elapsing will be provided on display 125, when the operator checks the reason for the alarm. If the defrost program is running because of a manual request, step 442 also sets the alarm DEFEL, it resets the manual defrost input MD, and it sets the manual defrost flag not-true. Steps 440 and 442, as well as the "no" branch from step 436, advance to step 444.

Step 444 sets the time defrost flag TDF to 0, since defrost has terminated, and steps 446, 448 and 450 implement a desirable feature of the invention which dissipates heat build-up in evaporator coil 62 before opening damper 93. This prevents the heat build-up from being discharged into load space 90, preventing the heat build-up from affecting the discharge air sensor 104. This provides a much smoother operation for unit 20, as it prevents unit 20 from going into transitory operations due to a sudden burst of heat into the load space 90.

Step 446 starts this aspect of the invention by de-energizing heat relay 160, which places unit 20 in a cooling cycle, cooling evaporator coil 62. Step 446 also starts a timer which elapses after a predetermined period of time, selected to insure that the evaporator heat build-up has dissipated, such as 30 seconds. Step 448 updates the 30 second timer, and step 450 detects when it elapses. Once step 450 finds the 30 second timer elapsed, step 452 turns of the defrost indicator light in display 125, it de-energizes damper relay 164, which should de-energize damper solenoid 184, which in turn opens damper 93.

After a short delay, step 454 determines if the input 211 from damper solenoid 184 is indeed low, indicating that damper solenoid 184 has been de-energized as requested. If the damper solenoid input 211 is not low, step 456 sets an alarm DMPST, it turns on the alarm indicator light in display 125, and it sets the unit shutdown flag SDF true. Alarm DMPST indicates that the damper 93 is closed, and it also indicates that there is a problem with damper relay 164 or its associated circuitry. The next time that the mode decision program 236 shown in FIG. 4 is run, step 278 will find the unit shutdown flag SDF true, and step 280 will shut unit 20 down, as transport refrigeration unit 20 cannot be allowed to run with damper 93 closed.

If step 454 finds that the damper solenoid input 211 is low, as it should be in response to step 452 de-energizing damper relay 164, defrost has terminated successfully, and step 454 goes directly to the program exit at 458.

We claim:

1. A method of defrosting an evaporator coil of a transport refrigeration unit having a refrigerant circuit which includes a compressor and an evaporator coil having a coil temperature sensor, and microprocessor based electrical control for controlling the temperature of a served space by drawing air from the served space, conditioning the air with the evaporator coil, and returning the conditioned air to the served space, comprising the steps of:

requesting a manual defrost operation,
determining whether the evaporator coil temperature sensor is functional, or faulty,
overriding the request for the manual defrost operation when the determining step finds the evaporator coil temperature sensor is faulty,
determining if the compressor of the transport refrigeration unit is running,
determining if the transport refrigeration unit is set to operate in a cycling mode when the compressor is not running,
and overriding the request for the manual defrost operation when the compressor is not running and the transport refrigeration unit is not set to operate in a cycling mode.

2. The method of claim 1 including the steps of:
checking the temperature of the evaporator coil when the determining step finds the evaporator coil temperature sensor functional,
and overriding the request for the manual defrost operation when the temperature of the evaporator coil exceeds a predetermined temperature.

3. The method of claim 1 including the steps of:
providing a timed defrost operation,
determining if a timed defrost operation has been requested,
and overriding the request for the manual defrost operation in response to a request for a timed defrost operation.

4. The method of claim 1 including the step of starting the compressor when the compressor is not running, and the transport refrigeration unit is set to operate in the cycling mode.

5. A method of defrosting an evaporator coil of a transport refrigeration unit having a refrigerant circuit which includes a compressor and an evaporator coil having a coil temperature sensor, and microprocessor based electrical control for controlling the temperature of a served spaced by drawing air from the served space, conditioning the air with the evaporator coil, and returning the conditioned air to the served space, comprising the steps of:

requesting a manual defrost operation,
determining whether the evaporator coil temperature sensor is functional, or faulty,
overriding the request for the manual defrost operation when the determining step finds the evaporator coil temperature sensor is faulty,
checking the temperature of the evaporator coil when the determining step finds the evaporator coil temperature sensor is functional,
providing defrost in response to a timed request,
determining if a timed request for defrost has been generated,
determining if the compressor is running,
determining if the transport refrigeration unit is set to operate in a cycling mode when the compressor is not running,
allowing the request manual defrost operation, in the absence of a timed request, when the temperature of the evaporator coil is below a predetermined temperature, and the compressor is running,
allowing the request manual defrost operation, in the absence of a timed request, when the temperature of the evaporator coil is below a predetermined temperature, the compressor is stopped, and the transport refrigeration unit is set to operate in a cycling mode,
and starting the compressor when it is stopped, in response to the step of allowing the request manual defrost operation.

6. A method of defrosting an evaporator coil of a transport refrigeration unit having a refrigerant circuit which includes a compressor and an evaporator coil having a coil temperature sensor, microprocessor based electrical control for controlling the temperature of a served space to a predetermined set point temperature by drawing air from the served space, conditioning the air with the evaporator coil, and discharging the conditioned air to the served space, and a discharge air temperature sensor, comprising the steps of:
providing a timed request for defrost,
determining whether the evaporator coil temperature sensor is functional, or faulty,
determining if the set point temperature is above a predetermined value, when the coil temperature sensor is found to be faulty,
allowing the timed request to initiate a defrost operation when the set point temperature is not above the predetermined value, overriding the timed request when the set point temperature is above the predetermined value, determining whether the discharge air temperature sensor is functional, or faulty, terminating defrost in response to the discharge air temperature reaching a predetermined value, when the discharge air temperature sensor is found to be functional, and terminating defrost in response to time when the discharge air temperature sensor is found to be faulty.

7. A method of defrosting an evaporator coil of a transport refrigeration unit having a refrigerant circuit which includes a compressor and an evaporator coil having a coil temperature sensor, and microprocessor based electrical control, including a defrost interval timer, for controlling the temperature of a served space to a predetermined set point temperature by drawing air from the served space, conditioning the air with the evaporator coil, and returning the conditioned air to the served space, comprising the steps of:

providing a timed request for defrost initiated by the defrost interval timer, determining whether the evaporator coil temperature sensor is functional, or faulty, checking the temperature of the evaporator coil when the determining step finds the evaporator coil temperature sensor is functional, determining if the compressor is running, allowing the timed request to initiate defrost when the checking step finds the temperature of the evaporator coil is below a predetermined value and the compressor is running, comparing the temperature of the served space with the set point temperature to determine if the temperature of the served space is within a predetermined range of set point, and setting the time interval between timed defrost requests in response to whether the temperature of the served space is inside or outside the predetermined range of the set point temperature.

8. The method of claim 7 including the step of overriding the timed request for defrost when the compressor is not running.

9. The method of claim 8 including the step of resetting the defrost interval timer in response to the step of overriding the timed request.

* * * * *